Jan. 17, 1933.  K. HOFFMANN  1,894,769

REVOLVING FIRE PREVENTING SHUTTER FOR CINEMATOGRAPHIC PROJECTION APPARATUS

Filed Aug. 30, 1930

INVENTOR.
Kurt Hoffmann
BY George C. Heinicke
ATTORNEY.

Patented Jan. 17, 1933

1,894,769

UNITED STATES PATENT OFFICE

KURT HOFFMANN, OF DRESDEN, GERMANY

REVOLVING FIRE PREVENTING SHUTTER FOR CINEMATOGRAPHIC PROJECTION APPARATUS

Application filed August 30, 1930, Serial No. 479,044, and in Germany December 23, 1929.

This invention relates to improvements in cinematographic projection apparatus and it is the principal object of my invention to provide a fire shutter in form of a drum having light openings adapted to be closed by a shutter moving concentrically about the drum during its rotation and closing the light openings as soon as the rotation of the drum falls below a predetermined number of revolutions per minute.

Another object of my invention is the provision of a device of this character which is simple and inexpensive in its construction, yet durable and highly efficient in its operation, as well as economic, as it requires comparatively little space.

A further object of my invention is the provision of a device of this type in which the shutter is adapted to be regulated in its movements either by means of a centrifugal regulator or manually by moving the shutter into a position in which it exposes the light opening and in which it is held by a suitable holder automatically releasing the shutter as soon as the rotation of the drum falls below a predetermined number of revolutions per minute or upon breaking of the film.

The nature of my invention will appear sufficiently clear and its further objects and advantages will become more fully apparent by noting the accompanying description and drawing and will then be specifically defined in the appended claims.

In the accompanying drawing forming a material part of this disclosure:

Figure 1:
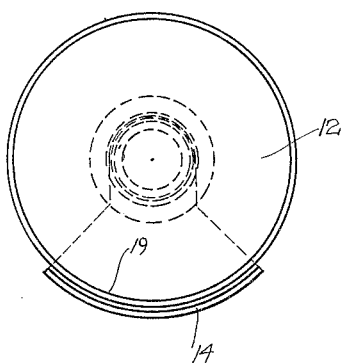
Fig. 1 is a front elevation of a device constructed according to my invention.
Figure 2:
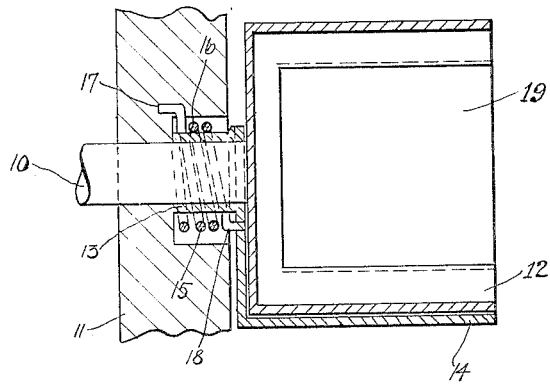
Fig. 2 is a sectional side elevation thereof.

As illustrated, a shaft 10 journaled in a wall 11 or other suitable support carries the drum 12. A sleeve 13 is rotatably arranged upon shaft 10 and carries the fire-shutter 14 so that the same can rotate concentrically around the drum 12.

A chamber 15 is formed in wall or support 11 in which a spring 16 is wound about sleeve 13 having one of its ends 17 secured in wall 11 while its other end 18 is anchored in the shutter 14.

The device operates as follows: When the projection is started, the shutter 14 is turned by hand to expose the light opening 19 and is held in its elevated position by means of a suitable holder of well known construction which is constructed so as to release the shutter as soon as the film breaks at which time the shutter 14 is returned by the spring 16 to its original position and closes the opening 19.

It will be clear that the form of the shutter is preferably conformed to the shape of the drum, however, under certain conditions it may also have the form of a plane surface.

It will be evident that while I have described and illustrated my invention in its preferred form, it will not be necessary to strictly adhere to said form, and it is therefore, not my desire to be limited as to the particular form described and shown, but to reserve my right to make such changes in its construction, as come within the scope of the appended claims without departing from the spirit of my invention and the principles involved.

Having thus described my invention what I claim as new and desire to secure by Letters Patent is:

1. In a cinematographic projecting apparatus, a support, a drum formed with a light opening and having a shaft projecting from one end and journaled through said support, the support being formed with a chamber about said shaft, a sleeve fitting loosely about said shaft within the chamber, a fire shutter extending longitudinally of said drum and having an arm at one end carried by said sleeve, and a coiled spring of selected strength wound about said sleeve within the chamber and having one end secured to the support and its other end anchored to said arm, said spring yieldably holding the shutter in a normal position to close the opening of the drum and permitting movement of the shutter into and out of position to close the opening.

2. In a cinematographic projecting apparatus, a support, a drum formed with a light opening and having a shaft rigid with the drum and rotatably engaged with said support, a sleeve fitting loosely about said shaft, a fire shutter movable about the drum into and out of position to close said opening and having an arm extending towards the shaft and carried by said sleeve, and a spring coiled about said sleeve and having one end secured to said support and its other end anchored to said arm, said spring yieldably holding said shutter in a normal position to close the light opening of the drum.

Signed at Dresden, Germany, in the county of Saxony and State of Germany this 2nd day of August, A. D. 1930.

KURT HOFFMANN.